Patented Jan. 10, 1950

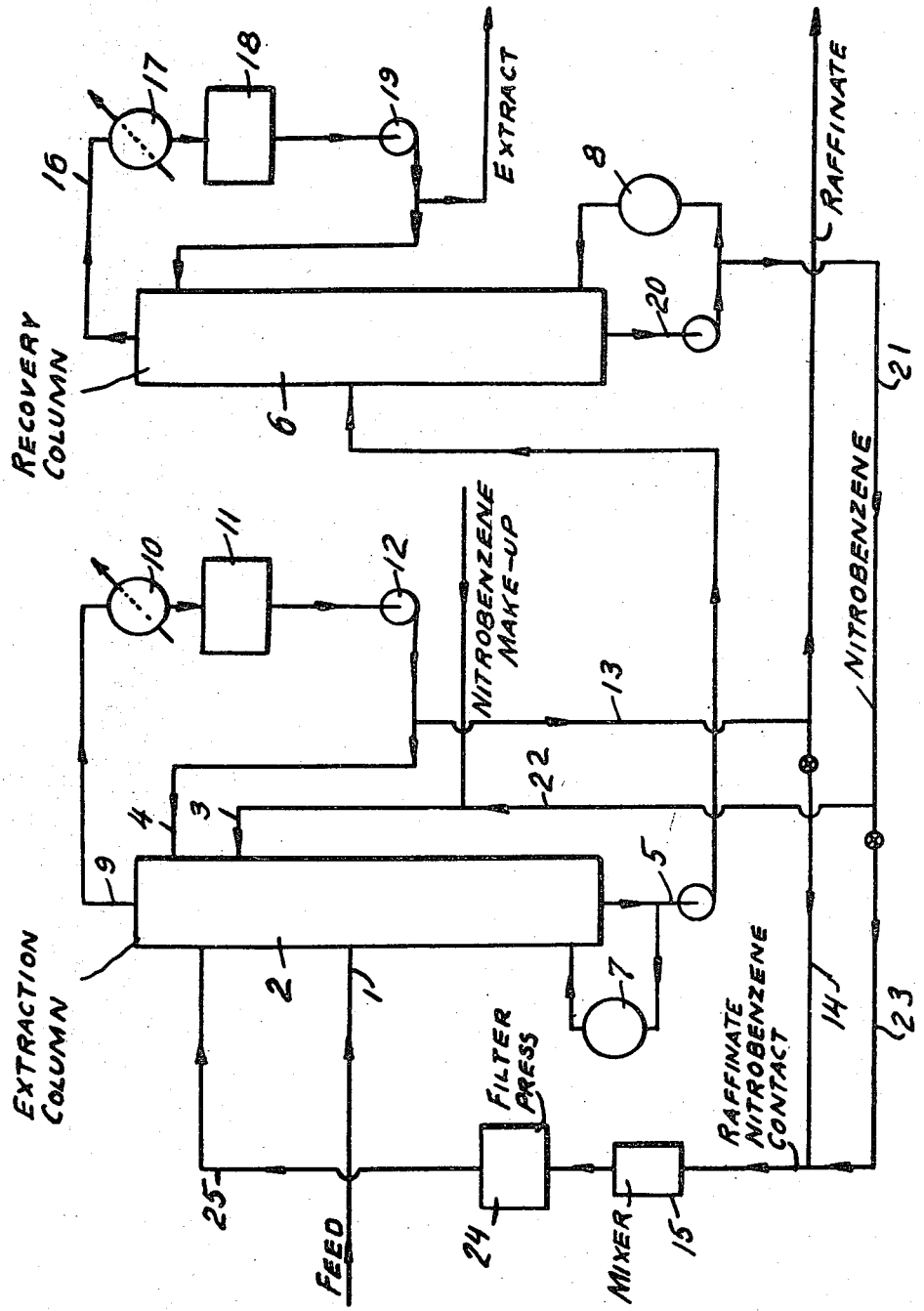

2,494,274

UNITED STATES PATENT OFFICE 2,494,274

EXTRACTIVE DISTILLATION PROCESS

Rudolph C. Woerner, Homewood, Ill., assignor to Sinclair Refining Company, New York, N. Y., a corporation of Maine Application August 31, 1948, Serial No. 47,044

3 Claims. (Cl. 202—39.5)

This invention relates to improvements in the recovery of xylenes from light hydrocarbon stocks by extractive distillation with nitrobenzene, and, more particularly to an improved method for controlling the formation of sludge or polymer which occurs in the circulating nitrobenzene solvent of a continuous extractive system in the presence of hydrocarbons under the operating conditions.

Light hydrocarbon fractions derived from catalytic cracking operations contain high percentages of xylenes which may be profitably recovered by extractive distillation by means of a selective solvent such as nitrobenzene. I have found, however, that in the presence of hydrocarbons under the necessary conditions of elevated temperature nitrobenzene forms a gum or polymer product which must be controlled in a continuous system by withdrawing a certain amount of circulating nitrobenzene from the system and replacing it with either fresh or depolymerized nitrobenzene. I have discovered that gum formation is non-catalytic; that is, the rate of gum formation is a direct function of time but is independent of gum concentration. The rate of gum formation, however, approximately doubles with each 25° F. rise in reaction temperature. The daily solvent replacement rate under average operating conditions may amount for example to 21% of the nitrobenzene hold-up in the system to maintain polymer concentration at 2.0 weight per cent. Hence polymer formation not only reduces the efficiency of separation but occasions high solvent consumption, and unless it is controlled may seriously threaten successful operation of the process.

Polymer can be removed from nitrobenzene by distillation, but I have found that polymer can also be removed by a surprisingly simple and convenient precipitation process without necessity of auxiliary heating and provision of heat exchange and fractionation equipment. Portions of contaminated solvent may be intermittently or continuously withdrawn from the solvent stream according to the desired replacement ratio, and may be diluted with the paraffinic raffinate so as to precipitate gum or polymer from the mixture. The precipitated polymer is then physically separated from the solvent-raffinate mixture as by filtration, for example, and the liquid mixture is returned to the system.

Although the exact composition and mechanism of the polymer formation is not known, the polymer consists of non-volatile solids which are soluble in nitrobenzene and slightly soluble in straight-run distillate and which discolor the solvent. It is not the typical petroleum "gum" mixture, but is probably a single type of chemical compound, say, N,N'-diphenylphthalamide. I believe that the mechanism of gum formation may be as follows: The nitrobenzene oxides xylenes to phthalic acids, and itself is simultaneously reduced to aniline. The phthalic acids then react with the aniline to form phenyl ammonium phthalates which, at the operating temperatures involved, are dehydrated to the phenyl phthalamides. Strong evidence for the above mechanism is the molecular weight of 328.2 and nitrogen content of 8.97% found for the recovered gum. In addition, water has always been found despite most careful drying of all stocks entering the system.

However, my invention is a method of controlling polymer build-up in the nitrobenzene and an improved xylene extractive process embodying this control, and is in no way predicated on the above explanation of the mode of polymer formation.

In my process a xylene-containing stock, e. g. a 275° to 300° F. boiling range catalytic cracking cut, is fed into an extraction column, along with the nitrobenzene solvent and reflux. Upon contact and treatment within the column, non-aromatic raffinate is taken overhead, and the fat solvent containing the bulk of the xylene fraction is removed from a lower portion of the column. The extract is then recovered by fractionation in a stripping column, and the stripped solvent recycled to the system.

A portion of the recirculating solvent is intermittently or continuously withdrawn to a mixing chamber where it is contacted with one or more volumes of raffinate recovered from the overhead stream. The effectiveness of the precipitation is improved with the ratio of dilution of solvent, with proportions of raffinate to solvent ranging up to about 9:1 required for complete gum removal. However, I have made satisfactory gum reductions with ratios of 2:1, 3:1, and 4:1 although I consider a ratio exceeding 3:1 desirable. I have found that a 4:1 or 5:1 ratio of raffinate to solvent represents a practical operating ratio for efficient operation. Precipitated solvent is removed by filtering or centrifuging, and the filtrate is returned to the extraction column as reflux. It is usually desirable to use a filter aid, such as Supercel, in the filtration step in order to prevent clogging of the filter.

My invention will be more fully described and illustrated by reference to the accompanying drawing which represents a flow diagram of an extractive distillation process embodying my invention.

Preheated hydrocarbon feed vapors 1 enter the middle of the extraction column 2, and are contacted with nitrobenzene 3 and reflux 4 entering at the top. The fat solvent containing the bulk of the xylene fraction, leaves the bottom of the extraction column, and is passed by line 5 to stripper or recovery column 6, wherein the xylene fraction is removed by stripping. Additional heat is supplied to the system by means of reboilers 7 and 8. The raffinate leaves the top of the extraction column by line 9 and is passed through condenser 10 to reflux drum 11, from which reflux is returned to tower 2 by pump 12 or is withdrawn to storage or passed by lines 13 and 14 to mixing chamber 15.

In stripper 6, extract is taken overhead through line 16, condenser 17, to reflux drum 18 from whence reflux may be returned to the tower or extract pumped to storage by pump 19. Stripped solvent is withdrawn through line 20 and returned by lines 21 and 22 to the top of tower 2. A portion of the recirculating solvent is passed through line 23, is contacted with raffinate from line 14, and is passed into mixing chamber 15. The mixture is then passed to filter 24 where precipitated polymer is separated and the filtrate is returned to tower 2 by means of line 25.

The practice of my invention will be further illustrated by the following examples, which are described to indicate available process conditions and methods, but are not intended to be limiting in this respect.

EXAMPLE I

The feed stock constituted a 42° API gravity, 275° to 300° F. boiling range naphtha cut containing approximately 50% xylenes derived by re-running a naphtha cut from a Houdry fixed catalyst bed unit, and was extracted with nitrobenzene in order to recover an aromatic extract having a purity of 95% or better. The extraction column comprised a steel column packed with raschig rings equipped with a reboiler pot to provide adequate heat capacity. The recovery or stripping column comprised a second steel column packed with raschig rings and provided with a reboiler pot. Vaporized hydrocarbon feed was introduced to the middle of the extraction column. Solvent was heated separately and was introduced with the reflux at the top of the column, and the raffinate taken overhead, condensed and collected in a reflux drum. The fat solvent containing the bulk of the xylene fraction was withdrawn from the bottom of the extraction column and passed to a surge tank. From the surge tank the fat solvent was pumped to a stripper where the hydrocarbon fraction was stripped out. Good stripping of the solvent is of importance as otherwise part of the aromatics will appear in the raffinate. Hourly gravities of the stripped solvent were taken and used as a guide for the operation of the stripper. Operating conditions on the extraction column are set by the hydrocarbon feed rate, solvent rate, and reflux rate. The bottoms temperature is adjusted to get the desired quantity of aromatic extract from the stripper. The operating data for a typical run follow in Table 1.

Table 1

| | Extraction Col. | Recovery Col. |
|---|---|---|
| *Operating Conditions* | | |
| Rates, cc./hour: | | |
| Hydrocarbon Feed | 1,577 | |
| Nitrobenzene | 7,800 | |
| Reflux | 4,500 | 1,800 |
| Temperatures, °F.: | | |
| Feed Preheat | 307 | 306 |
| Top | 312 | 306 |
| Reflux and Solvent | 295 | |
| Bottom | 428 | 442 |
| Bottom Metal | 422 | 435 |
| Do | 427 | 444 |
| Pressures, Top, p. s. i. g | 9.0 | 7.0 |
| Reflux Ratio: | | |
| External | 8.65 | |
| Internal | 10.40 | |
| Nitrobenzene/Feed Ratio, Volume | 5.14 | |
| Vol. Per Cent Nitrobenzene at Top of Column | 57.7 | |
| *Yields on Feed (Nitrobenzene Free) 100 Weight Percent Recovery Basis* | | |
| Extract, Wt. Per Cent | 66.0 | |
| Raffinate, Wt. Per Cent | 34.1 | |
| Xylene Recovery, Wt. Per Cent | 99.1 | |

The extract may be re-run at a high reflux ratio for maximum concentration of ortho-xylene. A heart cut of ortho-xylene of 91% purity amounting to 10% on the charge was obtained in the 293–295° F. range.

Within a short time after operation of the unit was started, it was observed that the nitrobenzene in the system became badly discolored due to the presence of gum or sludge. Quantitative determinations of the amount of gum formed were made by the ASTM gum method modified by dilution of the nitrobenzene with 9 volumes of C. P. benzene to aid its evaporation. Under the process conditions of this example and with an hourly withdrawal of 1,000 cc. of nitrobezene and its replacement with 1,000 cc. of fresh nitrobenzene, the gum content of the nitrobenzene in the unit increased rapidly to approximately 1.1 wt. per cent ASTM gum, at which time it remained constant. Upon a change to a 500 cc. hourly withdrawal-replacement rate, the gum content increased very rapidly to approximately 2.1 wt. per cent at which time it again remained constant at about double its previous value. When gum or polymer control process is changed to the method of my invention gum content is similarly maintained at a constant value, but the replacement requirements for fresh nitrobenzene are of course enormously reduced. For the nitrobenzene withdrawn from the system is diluted with 4 volumes of paraffinic raffinate taken off the extraction column, a small amount of Supercel is added to the mixture to prevent clogging, the mixture is filtered, and the filtrate is then returned to the extraction column.

EXAMPLE II

A second run was conducted upon a 275–300° F. boiling range second pass distillate from a TCC moving catalyst bed unit containing approximately 75% xylenes as feed stock. This material was run at the relatively high 5:1 solvent to feed ratio and with an 8:1 internal reflux ratio to recover a high purity extract, about 99% xylenes in the IBP to 300° F. range at some sacrifice in xylene recovery. The extraction column corresponded to a 24 to 30 bubble plate tower and the flow was similar to that of Example I. The split between the aromatic extract and "non-aromatic" raffinate was controlled by the extraction tower bottoms temperature; and in the preparation of high purity extract from the TCC stock the extract make was held relatively low to insure a high purity product. The extract was re-run at a 15:1 internal reflux ratio to recover a yield of about 14% ortho-xylene, and about 74% of mixed meta-para-xylenes. The operating conditions for this run are tabulated below.

Table 2

|  | Extraction Col. | Recovery Col. |
|---|---|---|
| *Operating Conditions* | | |
| Rates, cc./hour: | | |
| Hydrocarbon Feed | 1,488 | |
| Nitrobenzene | 7,375 | |
| Reflux | 2,480 | 1,436 |
| Temperatures, °F.: | | |
| Feed Preheat | 290 | 292 |
| Top | 336 | 312 |
| Reflux and Solvent | 293 | |
| Bottom | 412 | 432 |
| Bottom Metal | 405 | 428 |
| Bottom Metal | 410 | 428 |
| Pressures, Top, p. s. i. g | 5.5 | 5.5 |
| Reflux Ratio: | | |
| External | 4.97 | |
| Internal | 8.19 | |
| Nitrobenzene/Feed ratio, Volume | 5.12 | |
| Vol. Per Cent Nitrobenzene at Top of Column | 65.6 | |
| *Yields on Feed (Nitrobenzene Free) 100 Weight Percent Recovery Basis* | | |
| Extract, Wt. Per Cent | 68.5 | |
| Raffinate, Wt. Per Cent | 31.5 | |
| Xylene Recovery, Wt. Per Cent | 83.1 | |

As in the case of Example I a polymer or gum build-up in the nitrobenzene solvent occurred which could be held within arbitrarily selected limits by hourly solvent withdrawals and replacement with fresh or depolymerized nitrobenzene. My method of depolymerizing nitrobenzene was applied to the process as exemplified in Example II by withdrawing a sample of nitrobenzene from the unit and diluting it with 1:1, 1:2, 1:3, and 1:4 volumes of the paraffinic raffinate from the extraction tower, the mixture filtered, and the filtrate analyzed for polymer content (by the ASTM gum method or alternatively by the n-pentane insolubles or dilution-centrifuge methods). The results indicated that approximately 50% removal of polymer from the solvent was effected by 1:4 dilution with raffinate. Accordingly the hourly withdrawals of the nitrobenzene from the unit were treated with about 5 volumes of raffinate, filtered with the aid of a small amount of Supercel to remove the precipitated solids, and the filtrate was fed back into the extraction tower with the reflux and solvent. This practice proved to be equally as beneficial in controlling the polymer content of the nitrobenzene as the previous control method of replacing the withdrawn solvent with fresh nitrobenzene. Data taken over a 5-day period of operation demonstrated that the amount of polymer in the nitrobenzene did not change when purging with depolymerized solvent. In view of the fact that the same amount of solvent, that is, 500 cc. per hour, was withdrawn as before and only one-half the polymer content was removed by precipitation, it may be that the unremoved polymer returned to the system acted as a natural inhibitor. The results are tabulated in the following table.

*Polymer formation in nitrobenzene (maximum skin temperature of recovery column, 430–435° F.)*

| | 500 cc./hr. withdrawal and replacement with fresh nitrobenzene | | | | | 500 cc./hr. withdrawal and replacement with depolymerized nitrobenzene | | | | |
|---|---|---|---|---|---|---|---|---|---|---|
| Days in Unit | 10 | 11 | 12 | 13 | 14 | 15 | 16 | 17 | 18 | 19 |
| ASTM Gum-weight, percent | 2.85 | 2.55 | 2.30 | 2.05 | 1.80 | 2.00 | 1.65 | 1.80 | 1.00 | 2.25 |

Hence I have discovered a method for depolymerizing the nitrobenzene solvent used in the recovery of xylenes by extractive distillation from light, xylene-rich hydrocarbon fractions. I have found that the formation of the polymer is accelerated by increase in the reaction temperature, e. g. the rate of formation is approximately doubled with each 25° F. temperature rise. Further it appears that gum formation is non-catalytic and is directly proportional to time, at least in the lower range of gum concentrations. Thus a constant gum concentration for any give rate of nitrobenzene withdrawal replacement is eventually reached at which the amount of gum in the withdrawn nitrobenzene is equal to the amount formed within the system. As the proportion of hydrocarbon to nitrobenzene is increased, the rate of gum formation increases, e. g. the amount of gum formed at a 1:1 feed to solvent ratio is about four times the amount formed at a 1:9 feed to solvent ratio.

The specific withdrawal rate therefore will depend upon the characteristics of the feed stock, the allowable polymer concentration, the nitrobenzene hold-up in the system, and the temperature. The allowable polymer concentration will vary with the operating conditions and the feed stock characteristics, particularly its content of olefins boiling in the bottoms range. For the heavier olefins may also form gums which will contaminate the circulating solvent, and surprisingly enough these olefin gums are not effectively precipitated by the process raffinate. In any event, the concentration of polymer should be restricted to a low value, say 1 or 2%, in order not to interfere with the efficiency of the separation, and in order to avoid undue deposition of polymer on reboiler tubes and other equipment. For holding a 2% polymer concentration, a solvent withdrawal rate in the range approximating 10 to 20% of the solvent in the system per day is generally found sufficient. Although I have tried certain of the well known lubricating oil oxidation inhibitors, e. g. di-tertiarybutylparacresol and diphenylamine, these materials appear to be completely ineffective as inhibitors of gum formation under the conditions of operation. My invention therefore comprehends the method of depolymerizing nitrobenzene and the improved nitrobenzene continuous extractive distillation system incorporating it.

I claim:

1. In the method of recovering xylenes from xylene-rich light hydrocarbon fractions by continuous extractive distillation utilizing nitrobenzene as a selective solvent, the improvement which consists of controlling polymer build-up in the circulating solvent by withdrawing recirculating solvent from the system, diluting it with at least an equal volume of non-aromatic raffinate, removing precipitated solids, and returning the liquid mixture to the system.

2. In the method of recovering xylenes from xylene-rich light hydrocarbon fractions by continuous extractive distillation utilizing nitrobenzene as a selective solvent, the improvement which consists of controlling polymer build-up in the circulating solvent by withdrawing recirculating solvent from the system, diluting it with at least three volumes of non-aromatic raffinate, removing precipitated solids, and returning the liquid mixture to the system.

3. In the method of recovering xylenes from xylene-rich light hydrocarbon fractions by continuous extractive distillation utilizing nitrobenzene as a selective solvent, the improvement which consists of controlling polymer build-up in the circulating solvent by withdrawing recirculating solvent from the system at a rate within the range approximating 10 to 20 volume per cent of the solvent within the system per day, diluting it with at least three volumes of non-aromatic raffinate, separating precipitated solids by filtration, and returning the filtrate to the system.

RUDOLPH C. WOERNER.

REFERENCES CITED

The following references are of record in the file of this patent:

UNITED STATES PATENTS

| Number | Name | Date |
|---|---|---|
| 1,788,569 | Ferris | Jan. 13, 1931 |
| 2,288,126 | Dunn et al. | June 30, 1942 |
| 2,414,402 | Thodos et al. | Jan. 14, 1947 |